April 28, 1953
C. U. CARLSON
2,636,633
TOOL PROTECTING COVER
Filed April 18, 1950
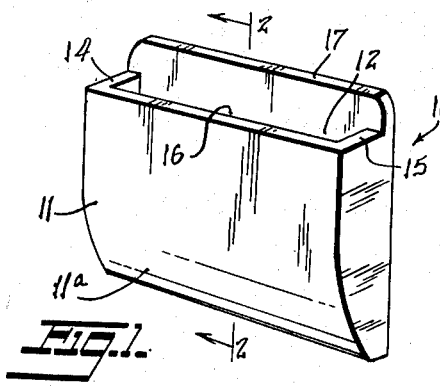
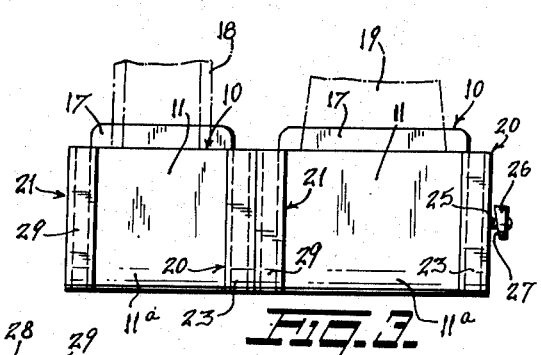
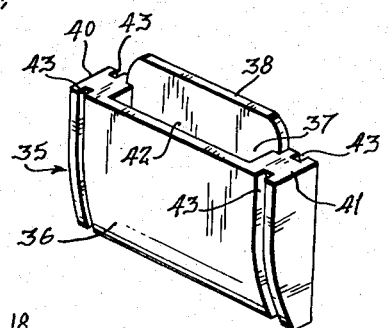
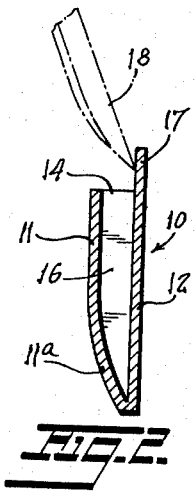
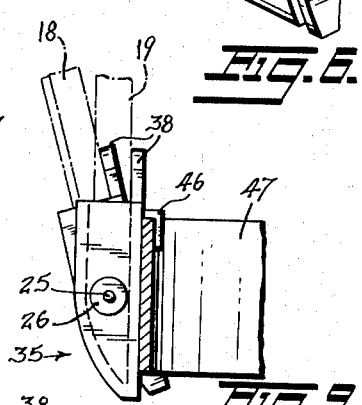
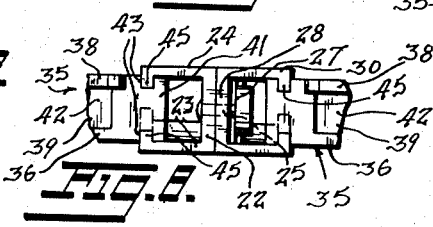
INVENTOR.
CARL U. CARLSON
BY
ATTORNEY

Patented Apr. 28, 1953

2,636,633

UNITED STATES PATENT OFFICE 2,636,633

TOOL PROTECTING COVER

Carl U. Carlson, Middle Village, N. Y.

Application April 18, 1950, Serial No. 156,615

6 Claims. (Cl. 220—23.4)

This invention relates to tool protecting sheaths and pertains particularly to sheaths for covering the sharpened edges of chisels, scrapers, axes, etc.

One object of the invention is to provide a novel, simple and inexpensively manufactured form of tool sheath which includes means whereby a tool may be guidedly inserted thereinto.

Another object of the invention is to provide a plurality of detachably secured together tool sheaths, each of which may be utilized for protecting the sharpened edge of a particular tool.

Another object of the invention is to provide novel means whereby a plurality of tool sheaths may be quickly and facilitatedly attachable and detachable.

Still another object of the present invention is to provide a plurality of attachable tool sheaths which may be carried at a worker's belt and which are differently positionable relative to each other to enable said worker to know the tool he is removing from a sheath simply by knowing the pre-set position of the sheath in which the tool is carried.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an isometric view of a tool sheath made in accordance with one embodiment of the present invention.

Fig. 2 is a sectional view taken along the lines 2—2 in Fig. 1.

Fig. 3 is a front elevational view illustrating means provided for detachably securing together a pair of sheaths of the type seen in Fig. 1.

Fig. 4 is an enlarged partially broken away isometric view illustrating the male and female fittings for securing the sheaths together.

Fig. 5 is a broken away front elevational view showing the cam collar of the male fitting in effective association with the cam surface of the female fitting.

Fig. 6 is an isometric view of a tool sheath made in accordance with a second embodiment of the invention.

Fig. 7 is an enlarged partially broken away isometric view of male and female fittings modified to cooperate with sheaths of the type disclosed in Fig. 6.

Fig. 8 is a partial plan view illustrating the modified fittings detachably securing together a pair of sheaths made in accordance with the second embodiment of the invention.

Fig. 9 is an end view illustrating the manner in which the attached sheaths are positionable differently relative to each other.

Now with reference to the drawings in more detail, and particularly to Figs. 1 and 2, it will be seen that a tool sheath 10 made in accordance with one embodiment of the invention is formed to provide a front wall 11, a rear wall 12 and left and right side walls 14 and 15 respectively. The side walls 14 and 15 space the front and side walls to thereby provide a tool receiving pocket 16. Also, formed at the top side of the said rear wall 12 is an upwardly extending tab 17.

The bottom portion 11ª of the front wall 11 is curved rearward and joins with the bottom edge of the rear wall 12, as shown in Fig. 2. This formation of the bottom portion 11ª gradually reduces the width of the pocket 16 at the bottom thereof, so that the tool regardless of the thickness thereof can only be inserted into the pocket until the faces of the tool contact the inner faces of the front wall 11 and the rear wall 12. The walls 11 and 12 thus act to support the tool in an elevated position within the pocket in which the cutting edge of the tool will be in a raised position off the bottom of the pocket affording adequate protection of that cutting edge.

Said sheath 10 may be formed of any pliable material, such as rubber, leather, plastic, etc., and as seen in Fig. 2 a tool designated 18 and shown in dot and dash lines may be guidedly inserted into the said pocket 16 by first engaging the cutting edge thereof with the front face of the tab 17 and permitting said edge to thereafter follow said tab face into the said pocket.

In certain lines of work it is necessary to carry several sharp edged tools. When such is the case it may be desirable to attach together several tool sheaths of the above described type. To this end there is provided, as seen in Figs. 3, 4 and 5, fittings whereby several sheaths may be detachably attached together. In Fig. 3 both sheaths, although different in width for accommodating different tools, such as a chisel 18 and a scraper 19, are made in accordance with the described first embodiment and are therefore both designated 10. Each of said sheaths is provided with a male fitting 20 and a female fitting 21. The male fitting 20 is channel-like in construction, having a side wall 22, and front and rear walls 23 and 24 respectively. A pin 25 is secured in said side wall 22 and carries loosely thereon a cam collar 26 having an inside cam face 27.

The female fitting 21 is also channel-like in construction, having a side wall 28, and front and rear walls 29 and 30, respectively. Formed in said side wall 28 is an aperture 31 and an elongated slot 32 opening into said aperture. Also, the inner surface of said side wall 28 about the slot 32 is formed as a cam surface 33. Now the aperture 31 is sufficiently large to receive the cam collar 26 and the slot 32 is large enough to receive only the pin 25. The purpose for this will be seen hereinafter.

The male fitting 20 may be attached to the right side of one of the sheaths 10 by inserting the side edge of said sheath between the walls 23 and 24 of the fitting and compressing said walls sufficiently to secure the sheath therebetween. Then the female fitting 21 may be similarly secured to the other side edge of the sheath. When two sheaths are each provided with a male and female fitting, said sheaths are detachably attachable by the cooperation of the male fitting of one with the female fitting of the other. Cooperation between the unlike fittings occurs when the cam collar 26 of the male fitting 20 is inserted into the aperture 31 of the female fitting 21 and said male fitting 20 is pressed downwardly to bring the cam face 27 on the collar 26 in cooperation with the cam surface 33 on the inner side of female fitting wall 28. To detach the sheaths the just described procedure is reversed.

A second embodiment of the sheath 35 (Fig. 6) is similar to the above described first embodiment in that it includes a front wall 36, a rear wall 37, an extension tab 38 on said rear wall, left and right side walls 40 and 41, respectively, and a tool receiving pocket 42. As in the case of the first form of the invention, the bottom portion 36ᵃ of the front wall 36 is curved inward and joined with the bottom edge of the rear wall 27 to gradually reduce the width of the bottom portion of the pocket 42. Unlike said first embodiment, the present sheath is provided in the front and rear walls with elongated vertical grooves 43 disposed adjacent and parallel to the said side walls, the purpose of which will be hereinafter described.

The present embodiment is provided with a male fitting 44 (Figs. 7 and 8) which is also of channel-like construction, including a side wall 22, front and rear walls 23 and 24, respectively, a pin 25 and a cam collar 26 carried loosely on said pin and having a cam face 27. Additionally, the present male fitting is provided with inwardly extending shoulders 46. Also provided is a female fitting 47 of channel-like construction and having a side wall 28, front and rear walls 29 and 30, respectively, an aperture 31, an elongated slot 32, and an inner cam surface 33. The present female fitting 47 is also provided with inwardly extending shoulders 45.

In order to secure the said male and female fittings 44 and 47, respectively, to the sheath 35, the said shoulders 45 on said fittings are slidingly fitted into the mentioned vertical grooves 43 in said sheath. The friction between sheath and fittings is sufficient to maintain them secured together until intentionally separated.

With two or more sheaths 47 fitted in the manner just described with male and female fittings, it is possible to detachably secure said sheaths in the manner identical to that described with reference to the first embodiment.

Now, in view of the fact that the cam collars 26 are carried loosely on the pins 25 and in view of the camming action between the cam faces 27 on the collars 26 and the cam surfaces 33 in the side walls 28 of the female fittings 21 and 47, it will be seen that in either of the described embodiments the attached sheaths are predeterminedly positionable differently relative to each other. This is seen in Fig. 9 in which a clip 46 is provided for carrying attached sheaths 10 or 35 on a belt 47 or like article. When thusly positioned, a user can reach for and choose, without looking, any one of a plurality of sheathed tools such as a chisel 18, a scraper 19, etc., simply by knowing the pre-set relative positions thereof.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. Means detachably and pivotally connecting together the adjacent sides of a pair of adjacent tool sheaths, comprising a channel shaped fitting mounted on the side of each of the tool sheaths, said fittings having side walls in facial contact with each other, a laterally extended pin mounted on the side wall of one of said fittings, and a collar mounted loosely on said pin and having a downwardly and outwardly sloped cam surface facing the said one fitting, the side wall of the other of said fittings having an aperture of a size to pass said collar and a slot extended downward from said aperture and of a size to admit said pin, so constructed and arranged that said collar can be passed through said aperture and moved downward to locate said pin in said slot, the side wall of the said other fitting having a downwardly inclined cam surface surrounding said slot to be engaged by the cam surface of said collar as said pin moves into said slot to draw said side walls into frictional contact to retain the sheaths in various positions pivoted about said pin.

2. Means detachably and pivotally connecting together the adjacent sides of a pair of adjacent tool sheaths, comprising a channel shaped fitting mounted on the side of each of the tool sheaths, said fittings having side walls in facial contact with each other, a laterally extended pin mounted on the side wall of one of said fittings, and a collar mounted loosely on said pin and having a downwardly and outwardly sloped cam surface facing the said one fitting, the side wall of the other of said fittings having an aperture of a size to pass said collar and a slot extended downward from said aperture and of a size to admit said pin, so constructed and arranged that said collar can be passed through said aperture and moved downward to locate said pin in said slot, the side wall of the said other fitting having a downwardly inclined cam surface surrounding said slot to be engaged by the cam surface of said collar as said pin moves into said slot to draw said side walls into frictional contact to retain the sheaths in various positions pivoted about said pin, and spaced front and rear walls continuing from the vertical side edges of said side walls and compressed into position on the adjacent side edge portions of the sheaths mounting said fittings in position on the sheaths.

3. Means detachably and pivotally connecting together the adjacent sides of a pair of adjacent tool sheaths, comprising a channel shaped fitting mounted on the side of each of the tool sheaths, said fittings having side walls in facial contact with each other, a laterally extended pin mounted on the side wall of one of said fittings, and a collar mounted loosely on said pin and having a downwardly and outwardly sloped cam surface facing the said one fitting, the side wall of the other of said fittings having an aperture of a size to pass said collar and a slot extended downward from said aperture and of a size to admit said pin, so constructed and arranged that said collar can be passed through said aperture and moved downward to locate said pin in said slot, the side wall of the said other fitting having a downwardly inclined cam surface surrounding said slot to be engaged by the cam surface of said collar as said pin moves into said slot to draw said side walls into frictional contact to retain the sheaths in various positions pivoted about said pin, and spaced front and rear walls continuing from the vertical side edges of said side walls and compressed into position on the adjacent side edge portions of the sheaths mounting said fittings in position on the sheaths, said fittings being metal and the sheaths being made of slightly compressible material to have said front and rear walls of said fittings compressed thereon.

4. Means detachably and pivotally connecting together the adjacent sides of a pair of adjacent tool sheaths, comprising a channel shaped fitting mounted on the side of each of the tool sheaths, said fittings having side walls in facial contact with each other, a laterally extended pin mounted on the side wall of one of said fittings, and a collar mounted loosely on said pin and having a downwardly and outwardly sloped cam surface facing the said one fitting, the side wall of the other of said fittings have an aperture of a size to pass said collar and a slot extended downward from said aperture and of a size to admit said pin, so constructed and arranged that said collar can be passed through said aperture and moved downward to locate said pin in said slot, the side wall of the said other fitting having a downwardly inclined cam surface surrounding said slot to be engaged by the cam surface of said collar as said pin moves into said slot to draw said side walls into frictional contact to retain the sheaths in various positions pivoted about said pin, and spaced front and rear walls continuing from the vertical side edges of said side walls for extension along the front and rear faces of the adjacent edge portions of the sheaths, the sheaths having vertical grooves in the front and rear faces of the adjacent edge portions, and shoulders extended inwardly from the free edges of said front and rear walls and frictionally engaged in said grooves mounting said fittings in position on the adjacent edge portions of the sheaths.

5. A tool holder comprising adjacent sheaths having tool receiving pockets opening downward from the tops thereof and adjacent sides, a channel shaped fitting mounted on the side of each of said tool sheaths, said fittings having side walls in facial contact with each other, a laterally extended pin mounted on the side wall of one of said fittings, and a collar mounted on the outer end of said pin, the side wall of the other of said fittings having an aperture of a size to pass said collar and a slot extended downward from said aperture and of a size to admit said pin, so constructed and arranged that said collar can be passed through said aperture and moved downward to locate said pin in said slot connecting said sheaths to be rotated relative to one another about said pin, and means for drawing said side walls of said fittings into tight frictional contact with one another to retain said sheaths in various pivoted positions with relation to each other.

6. A tool holder comprising adjacent sheaths having tool receiving pockets opening downward from the tops thereof and adjacent sides, a channel shaped fitting mounted on the side of each of said tool sheaths, said fittings having side walls in facial contact with each other, a laterally extended pin mounted on the side wall of one of said fittings, and a collar mounted on the outer end of said pin, the side wall of the other of said fittings having an aperture of a size to pass said collar and a slot extended downward from said aperture and of a size to admit said pin, so constructed and arranged that said collar can be passed through said aperture and moved downward to locate said pin in said slot connecting said sheaths to be rotated relative to one another about said pin, said collar having a downwardly and outwardly sloped cam surface facing the fitting carrying said pin, said collar being loosely mounted on the outer end of said pin, the side wall of the fitting having said slot also having a downwardly inclined cam surface surrounding said slot to be engaged by the cam surface of said collar as said pin moves into said slot to draw said side walls into frictional contact with each other to retain the sheaths in various pivoted positions about said pin.

CARL U. CARLSON.

References Cited in the file of this patent

UNITED STATES PATENTS

| Number | Name | Date |
| --- | --- | --- |
| 495,537 | Westerman | Apr. 18, 1893 |
| 986,395 | King | Mar. 7, 1911 |
| 1,281,299 | Crosson | Oct. 15, 1918 |
| 1,413,290 | O'Leary | Apr. 18, 1922 |
| 1,450,183 | Moon | Apr. 3, 1923 |

FOREIGN PATENTS

| Number | Country | Date |
| --- | --- | --- |
| 275,136 | Germany | June 9, 1914 |